March 9, 1965 J. V. SCHAFER 3,172,179
COLLAR FASTENER
Filed Aug. 12, 1963

INVENTOR.
JOHN V. SCHAFER
BY Charles S. Penfold
ATTORNEY

United States Patent Office 3,172,179
Patented Mar. 9, 1965

3,172,179
COLLAR FASTENER
John V. Schafer, 516 W. Chicago St., Bronson, Mich.
Filed Aug. 12, 1963, Ser. No. 301,431
3 Claims. (Cl. 24—91)

The subject invention relates to fastening means and more particularly is directed to a fastener or device which is preferably adapted to detachably connect overlapping portions of a garment, such as portions of a man's shirt collar.

A principal object of the invention is to provide a fastener which is adapted for connection with the conventional button and button hole of a shirt collar whereby the size of the collar may be enlarged.

More specifically, an object of the subject invention is to provide a fastener which comprises a structure having a button and a loop extending therefrom, in which portions of the loop are offset with respect to one another to render such portions resiliently flexible in a manner whereby the overall length of the fastener may be variably expanded or increased.

A significant object of the invention is to provide a fastener of the above character which is preferably moulded to provide a one-piece construction and the offset portions of the loop assist in stabilizing the position of the fastener and the overlapping portions of a collar when operatively connected thereto in a manner whereby the offset portions will allow for expansion of a normally tight collar to better accommodate it to the neck of the wearer.

A specific object of the invention is to provide a fastener which is constructed of moulded plastic and in which the loop is preferably gradually tapered so that it has a greater degree of flexibility at its free extremity than at its inner extremtiy which is joined to the button. Otherwise expressed, the loop is so designed and constructed that substantially all portions thereof are flexed in order to distribute the flexure and thereby prolong the life of the device.

An important object of the invention is to provide a loop structure which facilitates entry and release of a button on the garment with respect thereto.

Also, an object of the invention is to provide a fastener which is efficient in operation and durable in character.

Additional objects and advantages of the invention will become apparent after the description hereinafter set forth is considered in conjunction with the drawings annexed hereto.

Figure 1:
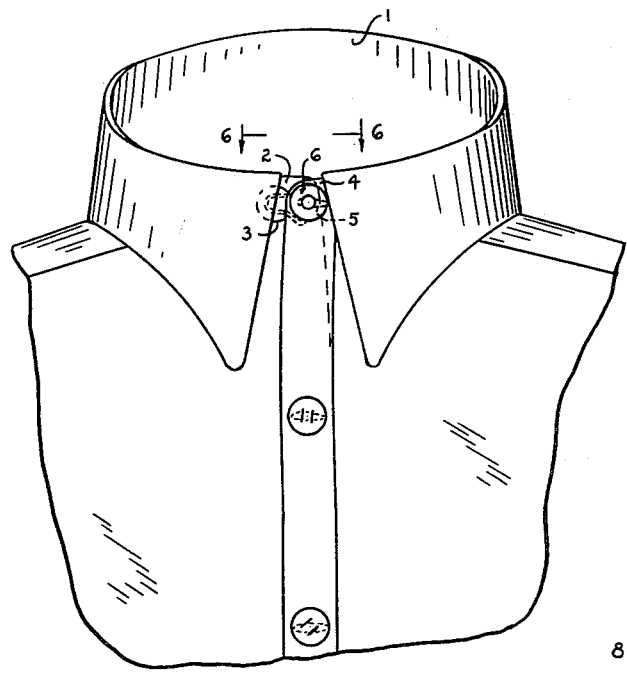
FIGURE 1 is a front elevational view of a portion of a shirt showing the fastener attached to the collar.
Figure 6:
FIGURE 6 is a partial transverse section taken substantially on line 6—6 of FIGURE 1.

Referring to the drawings and particularly to FIGURES 1 and 6, the shirt has a collar provided with a neckband 1 having an inner portion 2 provided with a conventional fastener in the form of a button 3 and an outer overlapping portion 4 provided with a conventional button hole 5 which is adapted to normally receive the button 3.

The device embodying the subject invention is preferably moulded to constitute a one-piece unit comprising a fastener preferably in the form of a button generally designated 6 and a loop generally designated 7.

The button 6 is preferably annular and includes a rim 8 and a cylindrical extension 9 extends axially from the button.

Figure 5:
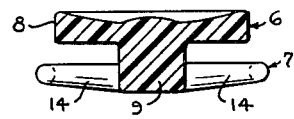
FIGURE 5 is a transverse section taken substantially on line 5—5 of FIGURE 4 illustrating structural details.
Figure 2:
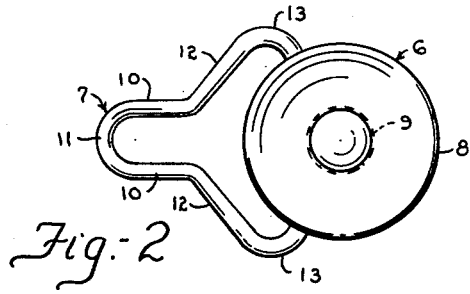
FIGURE 2 is an enlarged top view of the fastener.
Figure 4:
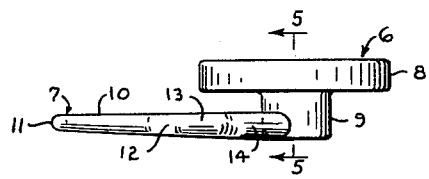
FIGURE 4 is an enlarged side elevational view of the fastener.
Figure 3:
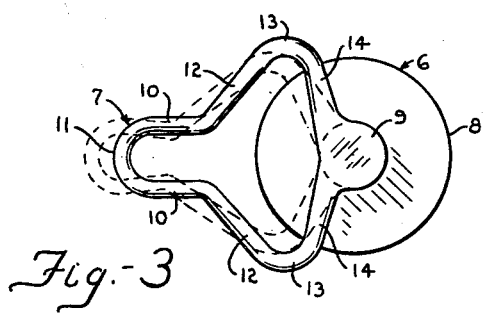
FIGURE 3 is an enlarged bottom view of the fastener.

The loop 7 may be formed in various ways, is resiliently flexible and normally maintains the shape shown in FIGURE 2. As depicted, it is joined to the extension 9 and disposed in a plane substantially parallel to the rim of the button as shown in FIGURES 4 and 5. The loop preferably includes a pair of corresponding substantially parallel side portions 10 joined together by a curved end portion 11. These side and end portions constitute an outer narrow part or extremity of the loop and define a small opening for receiving the button 3 on the shirt collar. The side portions 10 are respectively joined to the extension 9 by a pair of offset formations and each formation is comprised of a substantially straight portion 12 connected to side portion 10, a curved portion 13, and a substantially straight portion 14 which is preferably disposed at an oblique angle to the portion 12 and connected to the extension 9 as exemplified in FIGURE 3. The portions 14 generally diverge with reference to the extension and the portions 12 generally converge toward the narrow or free extremity of the loop.

It will be observed that the formations joining the side portions 10 of the loop with the axial extension 9 constitute laterally extending offsets or wings and enlarge the size of the loop to form a relatively large opening which will readily accommodate or receive the conventional button 3 on the shirt and facilitate its disposition in the smaller opening defined by the narrow portion or outer extremity of the loop when the device is being installed. It will also be observed that the distance between the portions 13 is somewhat greater than the diameter of the rim 8 and that the portions 14 are preferably slightly tapered or thicker at their junction with the extension 9 in order to promote reenforcement and assist in imparting stability to the loop. The formations serve to reenforce the loop and also serve to stabilize the position of the device in relation to the collar, the lapping portion of the collar, and the relationship of the collar to the wearer. The formations may be termed zig-zag in character and the obliquely disposed portions 12 and 14 of each formation afford a setup whereby they may move or flex relative to one another and particularly spread apart as evidenced by the dotted lines in FIGURE 3 when the device is being attached to a collar by the wearer of the shirt. Due to the unique design and construction of the loop substantially all portions thereof will be caused to flex, thereby distributing the flexure to facilitate detachability of the device to a collar and prolong the life of the device.

The device or fastener embodying the invention as alluded to above is intended for use to expand or increase the size of a shirt collar which has become tight on the neck of the wearer. With this objective in mind, the wearer of a shirt can readily install the device by merely manipulating the device so the loop receives the button 3 on the shirt and then inserting the button or fastener 6 of the device forwardly into the button hole 5 to connect the portions 2 and 4 of the collar. The loop is thus disposed and connected between the portions of the collar and the formations of the loop will impart stability to such portions. The device when so installed serves to increase the length of size of the collar and if, for any reason, the collar later becomes tight or it is expanded, for example, by sneezing, the formations will move relative to another, thereby increasing the length or size of the loop and affording relief and a comfortable asset to the wearer.

Figure 7:
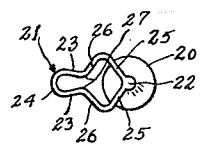
FIGURE 7 is a bottom view of a different form of a fastener.

The form of the device exemplified in FIGURE 7, is quite similar to the one above described and comprises a button or fastener 20 and a loop generally designated 21 carried by an axial extension 22 of the button. The loop includes an outer free extremity comprised of a pair of portions 23 and a curved end portion 24, which portions define a small opening for receiving the button 3 on the shirt collar. The loop also includes a pair of portions 25 which are joined to the extension and diverge therefrom, and a pair of portions 26 which join the portions 23 and 25 and converge generally toward the portions 23. The portions 25 and 26 define an opening which is somewhat larger than the smaller opening defined by the outer extremity of the loop and is adapted to initially receive the button 3 and facilitate its entry into the smaller opening. The converging and joining of the portions 23 and 26 define a pair of inwardly curved junctions 27 which serve to provide or form a restricted passage located between the large and small openings. These junctions assist in holding the button 3 in the smaller opening. These junctions, including the junctions between the portions 25 and 26 and the end portion 24 joining the portions 23 are curved and also serve to facilitate flexing of the loop at a plurality of locations, thereby prolonging the life of the device. Such flexing will enable the loop to increase in size or length or return to its original shape when it is being installed or removed, or after installation. It will be observed that the portions of the loop are substantially of uniform cross-section and that the loop includes offsets, wings or formations substantially corresponding to those above described.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A moulded one-piece plastic device of the kind described comprising a fastener, a resiliently flexible loop extending laterally from said fastener, said loop comprising a pair of coextending longitudinally extending side portions joined by a connecting end portion, each of said side portions being provided intermediate its length with an offset which offsets in combination define a relatively large formation located between said fastener and said end portion whereby the length of the loop may be increased when a pull is exerted on its end portion in a direction away from said fastener.

2. The device defined in claim 1, in which said fastener is in the form of an annular button provided with an axial extension and said side portions of said loop are joined to said extension, and said side portions at least adjacent said extension taper outwardly therefrom.

3. A one-piece moulded device of the kind described comprising a fastener provided with an extension and a loop, said loop being resiliently flexible and comprising a pair of divergent portions joined to said extension, a pair of spaced portions joined by an end portion defining a first opening, a first converging portion joining one of said divergent portions and one of said spaced portions, a second converging portion joining the other of said divergent portions and the other of said spaced portions, said diverging portions and said converging portions defining a second opening disposed adjacent said extension and being larger than said first opening and communicating therewith.

References Cited by the Examiner

UNITED STATES PATENTS

| | | |
|---|---|---|
| 265,459 | 10/82 | Sundberg. |
| 1,877,677 | 9/32 | Manaster. |
| 2,586,215 | 2/52 | Federico. |
| 2,899,731 | 8/59 | Maxim _____ 24—202.1 |
| 2,983,006 | 5/61 | Schafer _____ 24—73 |

FOREIGN PATENTS 609,783 11/60 Canada.

DONLEY J. STOCKING, *Primary Examiner.*